US005629078A

United States Patent [19]
Ganschow

[11] Patent Number: 5,629,078
[45] Date of Patent: May 13, 1997

[54] BACK-COATED ADHESIVE TAPE BASED ON A STITCH-BONDED WEB

[75] Inventor: Frank Ganschow, Elmshorn, Germany

[73] Assignee: Beiersdorf Aktiengesellschaft, Hamburg, Germany

[21] Appl. No.: 559,229

[22] Filed: Nov. 17, 1995

[30] Foreign Application Priority Data

Nov. 25, 1994 [DE] Germany .................. 44 42 092.7

[51] Int. Cl.$^6$ .................................................. B32B 7/12
[52] U.S. Cl. .................. 442/374; 428/317.3; 428/317.7; 428/352
[58] Field of Search ................. 428/317.3, 317.7, 428/354, 343, 355, 261, 235, 352

[56] References Cited

U.S. PATENT DOCUMENTS

| | | | |
|---|---|---|---|
| 4,232,489 | 11/1980 | Corvington et al. | 428/317.3 X |
| 4,587,152 | 5/1986 | Gleichenhagen et al. | 428/195 |
| 4,705,715 | 11/1987 | DeCoste, Jr. et al. | 428/317.3 X |
| 5,318,835 | 6/1994 | Sawamoto et al. | 428/317.7 |
| 5,334,447 | 8/1994 | Kitamura et al. | 428/317.3 |

FOREIGN PATENT DOCUMENTS

| | | |
|---|---|---|
| 3346100 | 7/1985 | Germany . |
| 9401037 | 4/1994 | Germany . |

*Primary Examiner*—Daniel Zirker
*Attorney, Agent, or Firm*—Sprung Horn Kramer & Woods

[57] ABSTRACT

Adhesive tape comprising a stitch-bonded web carrier whose lower surface has been provided with an adhesive coating, characterized in that the upper surface of the carrier has been provided initially with a coating of foam and then with a release coating or only with a release coating.

8 Claims, No Drawings

BACK-COATED ADHESIVE TAPE BASED ON A STITCH-BONDED WEB

The invention relates to an adhesive tape which consists of a stitch-bonded web carrier to whose upper surface has been applied initially a coating of foam and then a release coating of or only a release coating of and whose lower surface has been provided with an adhesive coating.

Adhesive tapes with a stitch-bonded web as textile carrier are known from DE-U-94 01 037. With this type of adhesive tape, the adhesive coating is preferably of the pressure-sensitive type. These adhesive tapes are simple in construction, but have appreciable disadvantages in use. The surfaces of such web carriers, with their many small elevations and depressions in between, result in initially more easily unwindable adhesive tapes, but, in general, nonplanar carrier materials are, if anything, undesirable for adhesive tapes, since they lead to defective bonds in use, for example in the multi-ply overwrapping of cable harnesses. The adhesion of the adhesive tape to a new substrate is additionally reduced by the fact that, on using a textile as carrier and dispensing with a treatment of the carrier back, it is found when an adhesive tape is unwound from a spiral roll that individual fibres from the region of the bare fibres at the surface of the carrier remain stuck to the adhesive coating. Moreover, the textile carrier material is exposed to enhanced wear and tear due to external mechanical stress, which reduces the practical life of the adhesive tape.

It is an object of the present invention to improve an adhesive tape of the type already described, in particular so that unwinding from a spiral roll does not give rise to any deterioration in the adhesive strength of the adhesive tape and at the same time the wear resistance of the adhesive tape is increased.

This object is achieved by an adhesive tape comprising a stitch-bonded carrier whose back is provided with a foam layer and release coating layer or only with a release coating layer, whereby the adhesive tape is given a smooth back which increases the life of the carrier material through the mechanical protection afforded by the applied film/release coating layer combination or the lacquer layer and also constitutes an optimal surface for adhesion in multi-ply overwrapping. Furthermore, the restriction of the adhesion of the adhesive coating during unwinding from a roll is reduced.

The carrier used for the adhesive tape is a stitch-bonded web. A stitch-bonded web is a web material with a multiplicity of mutually parallel seams. These seams are the result of stitching or stitch-knitting with textile threads. Such a web has long been manufactured for example on Malimo's stitch-knitting machines of the type "Maliwatt" and is available from Cottano GmbH and Techtex GmbH. The starting materials contemplated for the textile carrier include in particular polyester, polypropylene or cotton fibres. However, the present invention is not restricted to the materials mentioned; a multiplicity of further fibres can be used for manufacturing the web.

The carrier is preferably coated with foam and lacquer by the process described hereinafter. First an acrylate dispersion is foamed onto the carrier material by the doctor blade method. The resulting intermediate product is subsequently calendered causing densification on the one hand and incipient crosslinking of the foam on the other, before a layer of acrylate lacquer is applied atop the layer of foam, likewise by the doctor blade method.

The coating of the adhesive side of the carrier, in particular with a self-adhesive coating, can be effected in a conventional manner. It is advantageous to carry out the coating in a traditional manner using coating bars and solvent compositions, but it is preferred to carry it out contactlessly or almost contactlessly by means of screen printing (cf. DE-C-3,346,100), in which case a uniform or even segmented coating of adhesive is conceivable. Concerning the most favourable parameters, express reference is made to DE-C-3,346,100, in particular as regards the viscosity and type of adhesive, the screens used, web speeds and other measures. However, it is also possible to apply the coating by means of intaglio printing and spraying.

The adhesive tape can be manufactured in many variations. One possibility is described in the example which follows:

EXAMPLE

A polyamide web carrier having a basis weight of 100 g/m$^2$, available from Techtex GmbH, is coated in a stenter with a foamed acrylate dispersion (water content: 50% by weight). The coating is effected at a web speed of 30 m/min, continuously, and by the doctor blade method, the blade being disposed at a position of 25° relative to the zenith of the coating underroll, so that a foam weight of 250 g/l is obtained. Subsequently the foam-coated carrier is stenter-dried at an average temperature of 120° C. After drying, it is calendered in-line at 150° C. to 180° C. and a pressure of ten metric tons (causing densification on the one hand and incipient crosslinking of the foam on the other). The back of the foam-coated carrier is likewise coated in a stenter at a web speed of 50 m/min with 10 grams per square meter of halogen-free acrylate lacquer (Primal 225 from Rohm und Haas). The release coat is stenter-dried at 160° C., curing the foam at the same time. The natural rubber/resin/white spirit adhesive material is applied in a hang machine at a web speed of 50 m/min and a temperature of 60° C., again by the doctor blade method, the knife blade being disposed perpendicularly to the coating underroll.

I claim:

1. In an adhesive tape comprising a stitch-bonded web carrier having upper and lower surfaces, whose lower surface has been provided with an adhesive coating, the improvement which comprises coating the upper surface of a carrier with a coating selected from the group consisting of foam and then with a release coating or only with a release coating, wherein the release coating is produced by applying a halogen-free acrylate.

2. An adhesive tape according to claim 1, wherein the stitch-bonded web is selected from the group consisting of polyester, polypropylene, viscose, polyacrylic and cellulose fibres.

3. An adhesive tape according to claim 1, wherein the foam layer is applied by foaming a halogen-free acrylate dispersion.

4. An adhesive tape according to claim 1, wherein the coating with the foam has a thickness between 20 and 60 μm.

5. An adhesive tape according to claim 1, wherein the release coating has a thickness of 0.5 to 5 μm.

6. An adhesive tape according to claim 1, wherein the adhesive coating is a self-adhesive coating.

7. An adhesive tape according to claim 2, wherein the foam layer is applied by foaming a halogen-free acrylate dispersion.

8. In the bandaging of a cable harness in an automotive vehicle, the improvement which comprises executing said bandaging with a tape according to claim 1.

* * * * *